United States Patent
Danehorn et al.

(10) Patent No.: US 8,265,978 B2
(45) Date of Patent: Sep. 11, 2012

(54) COMPUTERIZED SCHEDULING SYSTEM AND METHOD FOR APPARATUS-IMPLEMENTED MEDICAL PROCEDURES

(75) Inventors: Kenneth Danehorn, Vaxholm (SE); Per Sundström, Åkersberga (SE)

(73) Assignee: Siemens Aktiengesellschaft, Munich (DE)

( * ) Notice: Subject to any disclaimer, the term of this patent is extended or adjusted under 35 U.S.C. 154(b) by 1486 days.

(21) Appl. No.: 11/232,677

(22) Filed: Sep. 22, 2005

(65) Prior Publication Data

US 2007/0067194 A1    Mar. 22, 2007

(51) Int. Cl.
*G06F 17/50*    (2006.01)
(52) U.S. Cl. ........... 705/7.22; 705/7.12; 705/7.13; 705/7.15; 705/7.16; 705/7.18
(58) Field of Classification Search ......... 705/8, 7.12, 705/7.13, 7.15, 7.16, 7.18, 7.22
See application file for complete search history.

(56) References Cited

U.S. PATENT DOCUMENTS

| | | | | |
|---|---|---|---|---|
| 2004/0122711 | A1* | 6/2004 | Miller et al. | 705/2 |
| 2005/0075906 | A1* | 4/2005 | Kaindl et al. | 705/2 |
| 2005/0234741 | A1* | 10/2005 | Rana et al. | 705/2 |
| 2006/0047554 | A1* | 3/2006 | Larsen et al. | 705/8 |
| 2006/0109961 | A1* | 5/2006 | Mahesh et al. | 379/93.25 |
| 2006/0143044 | A1* | 6/2006 | Conry et al. | 705/2 |

FOREIGN PATENT DOCUMENTS

| WO | WO 97/25682 | * | 7/1997 |
|---|---|---|---|
| WO | WO 00/77665 | * | 12/2000 |

* cited by examiner

*Primary Examiner* — Sarah Monfeldt
(74) *Attorney, Agent, or Firm* — Schiff Hardin LLP

(57) ABSTRACT

In a computerized system and method for scheduling medical procedures implemented by a number of medical apparatuses in a clinic or hospital, an exam or therapy is scheduled using a particular medical apparatus with a set time duration, and the exam or therapy is conducted and the actual time duration occupied by the medical apparatus to conduct the exam or therapy is recorded. The time durations for each medical procedure conducted by each medical apparatus are entered into and stored in a statistical data base. A scheduling computer has access to this statistical data base, and the next exam or therapy for the same apparatus is then scheduled using a time duration that is statistically updated based on the statistical compilation in the data base.

10 Claims, 1 Drawing Sheet

COMPUTERIZED SCHEDULING SYSTEM AND METHOD FOR APPARATUS-IMPLEMENTED MEDICAL PROCEDURES

BACKGROUND OF THE INVENTION

1. Field of the Invention

The present invention relates to a computerized system, as well as a computerized method, for scheduling a large number of medical procedures that are implemented using one or more medical apparatuses, such as for scheduling various types of cathlab procedures in a clinic or hospital.

2. Description of the Prior Art

Various different types of procedures involving catheterization of a patient are conducted on a daily basis in the cathlab (catheterization laboratory) of a modern clinic or hospital. Such procedures can involve medical imaging with contrast agent injection, such as angiography examinations intravascular stenting procedures, angioplasty procedures such as balloon angioplasty, and many other types of procedures. These different types of examinations and procedures respectively involve different types of medical examination apparatuses, and/or different combinations of medical equipment, to support the examination or treatment. Moreover, each type of procedure has a different time duration associated therewith, and the time duration for conducting the same type of procedure may vary from patient-to-patient dependent on complications that may be associated with each patient's pathological condition and general state of health.

Typically the different procedures in a cathlab are conducted using a relatively expensive imaging apparatus, such as a biplane C-arm, x-ray system, a computed tomography system or, in some instances, a magnetic resonance imaging system. Such systems are very expensive and represent a large investment on the part of clinic or the hospital. It is therefore in the best economic interests of the hospital and clinic to operate these different apparatuses as efficiently as possible, with as little "downtime" as possible. This is also in the best interest of the patient, since such efficient use represents one way to control the cost of such examinations.

Conventionally, generating a daily schedule for such procedures is undertaken manually, possibly with some degree of computer assistance. When a scheduling administrator is notified that a specific cathlab procedure is to be implemented on a specific patient by a specific cathlab team, the administrator either manually makes an estimate of the total time duration that the relevant cathlab equipment will be occupied for the procedure, including any planning that must take place prior to the actual procedure, and any post-procedure monitoring that must follow the procedure. Conventionally, these estimates are derived from experience on the part of the administrator, or possibly from a look-up table or printed document that lists each procedure together with its associated time duration.

Once these time duration estimates are made for each procedure that is to be conducted, computerized systems are known that can organize the various procedures into a sequence so that enough total time exists in the daily schedule to conduct all of the examinations. This scheduling sequence, however, is only as accurate as the estimated times permit. For numerous reasons, the standard time for a procedure obtained from a lookup table or a paper chart, or obtained from the experience of an administrator, may not be accurate for a particular examination by a particular team of a particular patient. If the estimated time duration is excessive, this results in the apparatus that was used to conduct the procedure being idle until the next-scheduled examination time. This represents an inefficient use of the apparatus that can add costs to the total daily operation of the hospital or clinic.

Extra costs may also be associated with an estimate that undershoots the actual occupation time of the medical apparatus because this may result in the operating hours of the cathlab having to be extended beyond normal operating hours in order to complete all of the examinations that have been scheduled for a given day. Not only does this result in inconvenience to the patients and the attending personnel, but also may result in costs associated with personnel overtime, extra energy consumption, or re-scheduling.

SUMMARY OF THE INVENTION

It is an object of the present invention to provide a computerized system and method for scheduling apparatus-implemented medical procedures wherein the time duration estimate for each procedure is as accurate as possible so as to improve the efficiency of use of all of the apparatuses that are used to conduct the various procedures.

This object is achieved in accordance with the present invention in a computerized system and method wherein, instead of a manually created time duration estimate for each procedure, a statistical data base for each apparatus is created that includes actual time durations for all types of procedures that have been conducted under all conditions using the apparatus. A scheduling sequence for all medical procedures to be conducted by all of the different apparatuses in a clinic or a hospital for a given day (or for any given period of time) is automatically determined in a manner that minimizes the downtime of each apparatus.

In the statistical data base maintained for each apparatus, all types of information are entered for each procedure conducted by that apparatus that affect the time duration of each procedure. Clearly, different procedures will inherently require different time durations to conduct, but even the same procedure may have a different time duration associated therewith depending on characteristics of the patient, such as the patient being overweight, or having an existing medical condition that requires special measures to be taken during the procedure. Another example is stenting. Instead of a general "one size fits all" time estimate for a cardio-stenting procedure, the statistical data base allows fine tuning of the estimated time duration depending, for example, on the location of the lesion that is to be stented. Some lesions may be present at locations in the cardio-vascular system that are more difficult to access for deployment of the stent than other locations. The estimated time duration for a stenting procedure that is currently being scheduled can be selected from the statistical data base for a previously-conducted procedure at which the stent was deployed at a comparable position that is expected in the current procedure.

In general, any aspect or feature of a cathlab procedure that has an effect on the time duration of the procedure can be logged into the statistical data base, and relied upon by itself, or in combination with other features, to provide an accurate estimate of the time duration for a particular procedure that is being scheduled. Once these accurately estimated time durations are determined for all procedures that are to be conducted within a given time frame (for example, a day, a week or even a month) a computerized software algorithm can be executed that schedules a sequence for the procedures wherein the downtime of each apparatus is minimized. The minimization of the downtime can be an individual minimization for each apparatus, or a collective minimization for all apparatuses within the given time frame. Moreover, minimization hierarchies can be established in the algorithm so that priority is given, for example, to minimizing the downtime of the most expensive apparatuses, or the most frequently used apparatuses, for which a long queue exists.

A suitable statistics data base can be obtained from the AXIOM Sensis Information System, commercially available from Siemens AG. Such a system already acquires a large amounts of statistical information for medical procedures conducted by an examination apparatus. This collected information can then be used in accordance with the invention in the manner described above.

DESCRIPTION OF THE PREFERRED EMBODIMENTS

Figure 1:
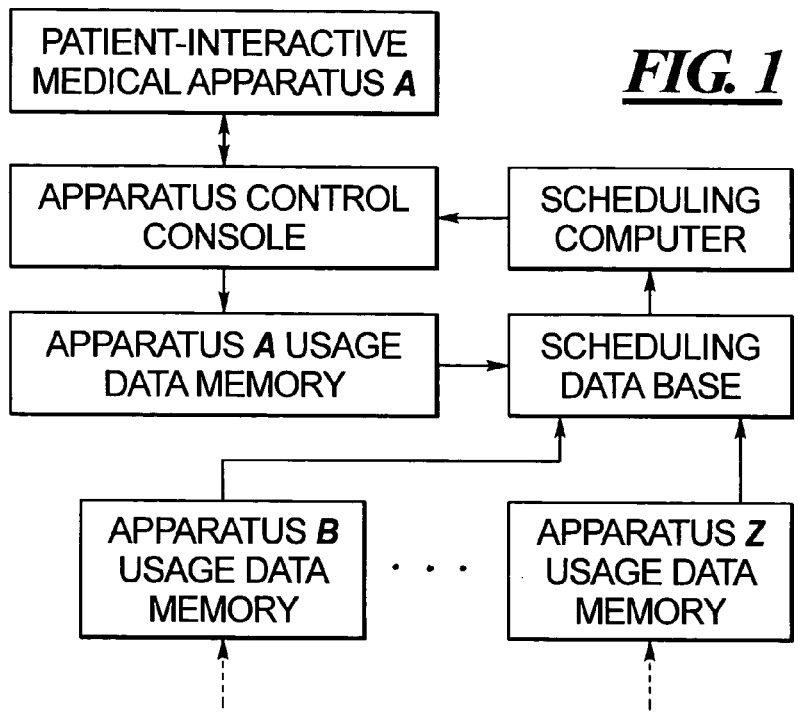
FIG. 1 is a block diagram of the basic components of a computerized scheduling system constructed and operating in accordance with the present invention.

The apparatus shown in FIG. 1 compiles a schedule for a predetermined time frame, such as a day, a week, a month, or any selected time frame, composed of a sequence of scheduled examinations to be conducted using multiple examination apparatuses, operated by different teams, to examine different patients. For example, the scheduling computer can be used to generate a schedule of various types of catheterization procedures of the type commonly conducted in a cathlab.

In the example shown in FIG. 1, a patient-interactive medical apparatus A is operated by an apparatus control console. The control console supplies operating commands and settings to the patient-interactive medical apparatus A, and receives information, including patient data and selected details of the procedure conducted by apparatus A during the course of the examination. This information includes not only a record of the total time occupied by the apparatus for each procedure, but also a breakdown of other parameters and settings that may have an effect on the time duration of the procedure.

Either by a manual selection made by an operator at the apparatus control console, or automatically, these time duration-effecting parameters including the time duration itself, are transferred upon completion of the procedure at apparatus A to an apparatus A usage data memory in communication with the apparatus control console. The apparatus A usage data memory in turn, transfers this information to a scheduling data base that is accessible by the scheduling computer. The scheduling data base receives similar information from other usage data memories respectively associated with other apparatuses, as schematically indicated by apparatus B usage data memory through apparatus Z usage data memory, also in communication with the scheduling data base. Although not shown in FIG. 1, the apparatus B usage data memory will be in communication with an operating control console for apparatus B, which is in turn is in communication with apparatus B. The same is true for all other apparatuses at the clinic or hospital, through apparatus Z. This is indicated by the input arrows to apparatus B usage data memory and apparatus Z usage data memory.

The scheduling data base represents a statistical compilation of the time duration, and time duration-affecting information for each procedure conducted by each apparatus in the hospital or clinic for which the scheduling computer must generate a schedule.

In the simplest case, the scheduling algorithm executed by the scheduling computer can form an average of the time durations of each of a selected number of most recently conducted examinations for each apparatus, correlated with the type of examination or procedure, so that the algorithm can make use of this "real life" information in executing the scheduling algorithm, rather than using manual estimates for such time durations. The algorithm executed by the scheduling computer then organizes the upcoming procedures for the relevant time frame so as to minimize the downtime of each apparatus, or at least to minimize the downtime of the most expensive apparatus or apparatuses, or to minimize the downtime of the apparatus or apparatuses typically having the longest queues.

Since the scheduling data base contains not only the basic time durations for each procedure, but also the additional time duration-affecting information for each procedure, the algorithm executed by the scheduling computer can make a more refined selection of procedures for averaging that represents a closest match to the procedures in the group of procedures that must be scheduled. For example, a catheterization procedure for a person with ambulatory difficulties likely will occupy more time than a catheterization procedure for an otherwise healthy person. When a person with ambulatory difficulties is among the patients for whom the scheduling computer must schedule a catheterization procedure, the specific average time duration for conducting the catheterization procedure in question for those types of patients can be used, instead of a general or "gross" average of time durations for all catheterizations of that particular type. Similar differentiation can be made for each time duration-affecting item of information, or selected items can be logically linked in a combination of patient attributes or complicating (time duration-extending) factors.

In FIG. 1, an arrow from the scheduling computer to the apparatus control console is shown, indicating that the day's, week's or month's schedule of procedures to be conducted at apparatus A can be supplied to the apparatus control console. This information can be communicated in various other ways, however, so such a connection is not essential.

Figure 2:
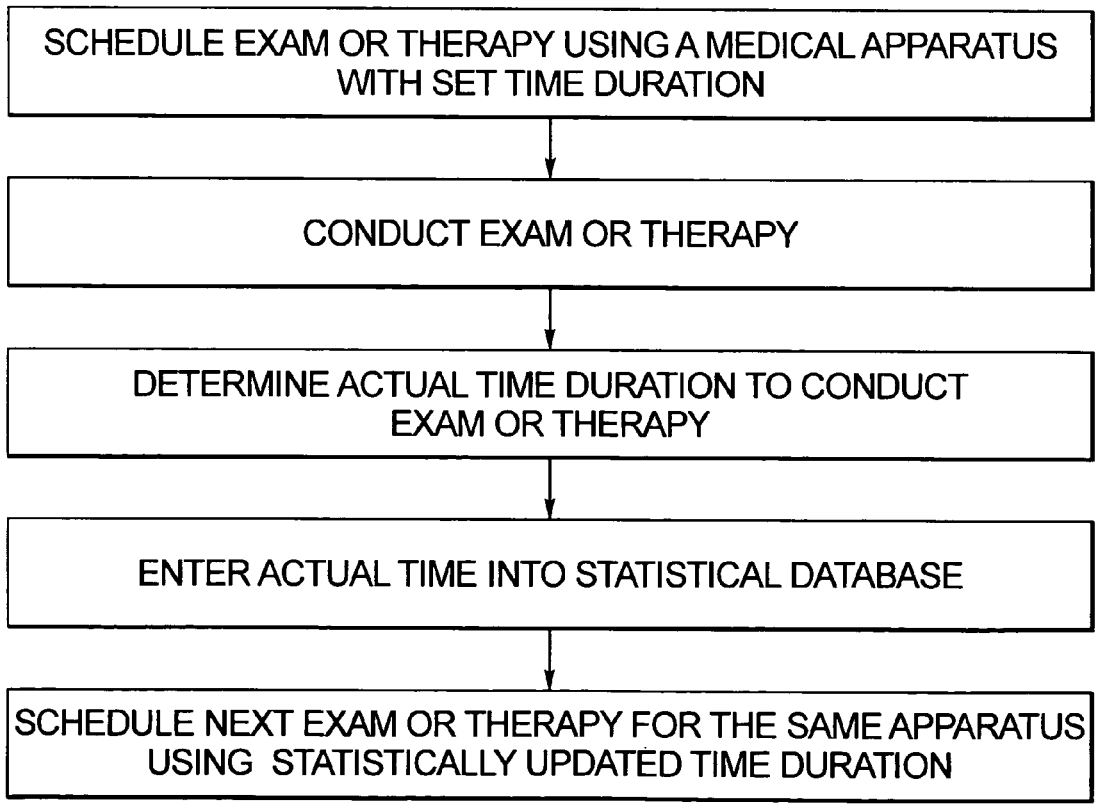
FIG. 2 is a flow chart illustrating the basic steps of an exemplary embodiment of a computerized scheduling method in accordance with the invention.

A basic flow chart of an embodiment of the inventive method is shown in FIG. 2. In order to start the accumulation of the statistics data base, an exam or therapy is scheduled using a particular medical apparatus with a set or manually estimated time duration. The exam or therapy is then conducted, and the actual time duration to conduct the exam or therapy is recorded. This recorded actual time duration is entered into the statistical data base, and the next time the same exam or therapy for the same apparatus is to be scheduled, this statistically updated time duration will be used. As more and more of the same type of exams or therapies are conducted with a particular medical apparatus under similar conditions, the running average maintained in the statistical data base, or calculated therefrom in the scheduling computer in the context of the scheduling algorithm will become increasingly accurate for use as the expected time duration of the next-scheduled exam or therapy of that type. Moreover, the statistically updated time duration in the last step in FIG. 2 can include adjustments or combinations made according to the additional time duration-affecting information that is contained in the statistical data base, as described above.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computerized medical procedure scheduling system comprising:
a plurality of medical apparatuses respectively available to conduct a plurality of medical procedures respectively involving different patients, each procedure occupying the medical apparatus conducting the procedure for a time duration;
a plurality of apparatus usage data memories respectively connected to said medical apparatuses in which usage data, including said time duration, are stored for each medical procedure conducted by the respective apparatus connected thereto, said usage data also including a time-duration affecting medical or physical condition respectively applicable to at least one predetermined type of patient, that causes said predetermined type of patient to have a degree of incompatibility to the conducting of the procedure that is expected to alter said time duration;

a scheduling data base in communication with each of said plurality of apparatus usage data memories in which a statistical compilation of actual time durations for all past medical procedures respectively conducted by all medical apparatuses is stored;

a scheduling computer having access to said scheduling data base configured to execute a scheduling algorithm to schedule future medical procedures to be conducted by said plurality of medical apparatuses, said scheduling computer executing said scheduling algorithm using the respective time durations from said statistical compilation as estimated time durations for said future procedures to generate a schedule for said future procedures that includes at least one downtime for at least one medical apparatus among said plurality of medical apparatuses, that results from there being said plurality of medical apparatuses to conduct said plurality of medical procedures, and said scheduling computer is configured to minimize the downtime when executing said scheduling algorithm to schedule said future medical procedures; and said scheduling computer, in executing said scheduling algorithm, being configured to determine whether a patient to be examined is said predetermined type of patient to whom said time duration affecting medical or physical condition applies and, when said patient to be examined is of said predetermined type, to calculate a new time duration that is an average of respective actual time durations for similar procedures conducted by the respective medical apparatus only on patients of said predetermined type to whom said time duration affecting medical or physical condition applies, and to use said new time duration instead of said estimated time duration to minimize said downtime for said future scheduling.

2. A system as claimed in claim 1 wherein said scheduling computer, in executing said scheduling algorithm, is configured to minimize a downtime of each of said medical apparatuses.

3. A system as claimed in claim 1 wherein said scheduling computer is configured to minimize, in executing said scheduling algorithm, a collective downtime of all of said medical apparatuses.

4. A system as claimed in claim 1 wherein said apparatuses include a most expensive apparatus, and wherein said scheduling computer, in executing said scheduling algorithm, is configured to prioritize minimization of downtime of said most expensive apparatus.

5. A system as claimed in claim 1 wherein said apparatuses include a most commonly used apparatus, and wherein said scheduling computer, in executing said scheduling algorithm, is configured to prioritize minimization of downtime of said most commonly used apparatus.

6. A computerized medical procedure scheduling method comprising the steps of:

for each of a plurality of medical apparatuses respectively available to conduct a plurality of medical procedures respectively involving different patients, each procedure occupying the medical apparatus conducting the procedure for a time duration, providing an apparatus usage data memories and storing usage data, including said time duration, for each medical procedure conducted by the respective apparatus associated with the apparatus usage memory and, in said usage data, also including a time-duration affecting medical or physical condition respectively applicable to at least one predetermined type of patient that causes said predetermined type of patient to have a degree of incompatibility to the conducting of the procedure that is expected to alter said time duration;

in a scheduling data base in communication with each of said plurality of apparatus usage data memory storing a statistical compilation of actual time durations for all past medical procedures conducted respectively by all medical apparatuses;

in a scheduling computer having access to said scheduling data base, executing a scheduling algorithm to schedule future medical procedures to be conducted by said plurality of medical apparatuses, using the respective time durations from said statistical compilation as estimated time durations for said future procedures to generate a schedule for said future procedures that includes at least one downtime for at least one medical apparatus among said plurality of medical apparatuses, that results from the availability of said plurality of medical apparatuses to conduct said plurality of medical procedures, and minimizing the selected downtime; and in said scheduling computer, in executing said scheduling algorithm, determining whether a patient to be examined is said predetermined type of patient to whom said time duration affecting medical or physical condition applies and, when said patient to be examined is of said predetermined type, calculating a new time duration as an average of the actual time durations duration for similar procedures conducted by that medical apparatus on patients of said predetermined type to whom said time duration affecting a medical or physical condition applies, and using said new time duration instead of said estimated time duration to minimize said downtime for said future scheduling.

7. A method as claimed in claim 6 comprising, in said scheduling computer, executing said scheduling algorithm to minimize a downtime of each of said medical apparatuses.

8. A method as claimed in claim 6 comprising, in said scheduling computer, executing said scheduling algorithm to minimize a collective downtime of all of said medical apparatuses.

9. A method as claimed in claim 6 wherein said apparatuses include a most expensive apparatus, and comprising, in said scheduling computer, executing said scheduling algorithm to prioritize minimization of downtime of said most expensive apparatus.

10. A method as claimed in claim 6 wherein said apparatuses include a most commonly used apparatus, and comprising, in said scheduling computer, executing said scheduling algorithm to prioritize minimization of downtime of said most commonly used apparatus.

* * * * *